(12) United States Patent
Govindan et al.

(10) Patent No.: US 9,760,145 B2
(45) Date of Patent: Sep. 12, 2017

(54) SAVING THE ARCHITECTURAL STATE OF A COMPUTING DEVICE USING SECTORS

(71) Applicant: Advanced Micro Devices, Inc., Sunnyvale, CA (US)

(72) Inventors: Madhu S. S. Govindan, Austin, TX (US); William L. Bircher, Austin, TX (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 161 days.

(21) Appl. No.: 14/716,314

(22) Filed: May 19, 2015

(65) Prior Publication Data
US 2016/0342354 A1 Nov. 24, 2016

(51) Int. Cl.
*G06F 1/32* (2006.01)

(52) U.S. Cl.
CPC ...................................... *G06F 1/32* (2013.01)

(58) Field of Classification Search
CPC ............ G06F 12/0815; G06F 12/0808; G06F 12/0891; G06F 12/0811; G06F 12/0817
USPC .................................................. 711/141, 144
See application file for complete search history.

(56) References Cited

U.S. PATENT DOCUMENTS

| | | | |
|---|---|---|---|
| 8,549,230 B1* | 10/2013 | Chatterjee | G06F 3/0608 711/113 |
| 2002/0087816 A1* | 7/2002 | Atkinson | G06F 12/08 711/156 |
| 2012/0011504 A1* | 1/2012 | Ahmad | G06F 12/08 718/1 |
| 2012/0233411 A1* | 9/2012 | Pohlack | G06F 12/0815 711/147 |
| 2014/0095771 A1* | 4/2014 | Lee | G06F 12/0804 711/103 |
| 2015/0095576 A1* | 4/2015 | Subrahmanyam | G06F 12/0891 711/119 |

* cited by examiner

*Primary Examiner* — Sean D Rossiter
(74) *Attorney, Agent, or Firm* — Park, Vaughan, Fleming & Dowler LLP (57) ABSTRACT

A system for saving the architectural state of a processor is described. The system performs a save state operation, which involves, for each sector in a set of sectors of the architectural state, determining whether the architectural state for the sector has already been saved to a memory, and saving the architectural state for the sector to the memory when the architectural state for the sector has not already been saved to the memory. Each sector in the set of sectors comprises a different and separate portion of the architectural state of the processor. The system determines whether the architectural state for a given sector has already been saved to the memory by checking a needs-rinsing flag for the given sector. The needs-rinsing flag for the given sector is asserted upon modifying the given sector and cleared following the save state operation.

24 Claims, 6 Drawing Sheets

SAVING THE ARCHITECTURAL STATE OF A COMPUTING DEVICE USING SECTORS

BACKGROUND

Field

The described embodiments relate to computing devices. More specifically, the described embodiments relate to a technique for fast entry into a power-gated state.

Related Art

Many computer systems employ power-saving techniques to reduce power consumption. Reducing power consumption is particularly important in portable electronic devices, where smaller power consumption generally translates to longer battery life, which in turn translates to increased productivity and end-user satisfaction.

One technique used for power saving is power-gating. In computer systems that employ power gating, when operating in a power-gated mode, the voltage to some circuits, e.g., the voltage to a processor, is reduced to a level below the normal operating voltage for those circuits. Because the power consumption of a circuit is proportional to the voltage applied to the circuit, reducing the voltage to some circuits can reduce the power consumption of the computer system.

A downside of reducing the voltage to a circuit is that the state of the circuit can be lost. For example, when the voltage supplied to a processor is reduced, the architectural state of the processor (e.g., register values and/or internal memory contents) can be lost. Some designs counteract such memory loss by saving the entire architectural state to temporary storage during entry into the power-gated mode, and then restoring the architectural state from the temporary storage when exiting the power-gated mode and returning to normal operation. However, saving the entire architectural state prior to entering the power-gated mode can be time consuming, which can increase the time required to enter the power-gated mode and/or reduce how frequently the processor can enter the power-gated mode.

Another technique for power-gating is to support retention mode in circuits in the computer system. For this technique, a circuit does not lose its architectural state in the low-power mode. Instead, the circuit enters a special mode called retention mode where the contents are preserved. Compared to a pure power-gating solution, this technique has a faster exit time from the low-power mode. However, there are two disadvantages to this technique. First, because the contents need to be preserved in the retention mode, the operating voltage for the circuit typically cannot be reduced as drastically as with the above described power-gating solution. This reduces the amount of power savings. Second, the system design cost increases significantly to support retention mode compared a non-retention mode.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Terminology

Throughout this description, "registers" is used to describe a set of processor elements that collectively store the processor's state. Note that the registers can include general-purpose registers, model-specific registers, configuration registers, status registers, system flags, and/or any other information that is to be saved prior to entering a power-gated mode.

Throughout this description, "sectors" is used to describe groupings of registers, i.e., a block of registers that are grouped together. In some embodiments this grouping is logical, i.e., there is no physical demarcation of the sectors. Determining how to group registers into sectors can depend on various factors, such as: which sub-units implement the registers (i.e., registers implemented in the same sub-unit are grouped together), the frequency with which data in the registers is expected to change (i.e., registers that change frequently are grouped together into a sector different from a sector for registers than do not change as frequently), and/or adjacency of the registers to a memory where the processor's state is to be saved.

Throughout this description, "set" is used to describe that a flag is set to a given value and "reset" or "clear" are used to describe that the flag is set to a different value. For example, in some embodiments a flag is a single bit that is set to 1 and reset/cleared to 0. In other embodiments, a flag is set to 0 and reset/cleared to 1.

Overview

Embodiments of the present invention preserve a processor's architectural state. Some embodiments divide the architectural state into sectors and separately save each sector to memory, with each of the sectors comprising a different and separate portion of the architectural state. Some embodiments perform rinsing and/or save state operations to preserve the architectural state.

Performing a rinsing operation generally involves saving modified sectors of the architectural state to memory. Some embodiments track sectors that have been modified since a last rinsing operation and save only the modified sectors to memory. During a current rinsing operation, sectors that have not been modified since the last rinsing operation can be skipped, i.e., their contents are not saved to memory during the current rinsing operation, because they were already saved to memory during the last rinsing operation.

Performing a save state operation generally involves saving to memory sectors that were modified since a last rinsing operation. Some embodiments perform the save state operation upon receiving an indication that the processor is to enter a low-power mode. For example, in some embodiments, software such as an operating system or an application that is executed by the processor (or another processor), and/or a hardware functional block coupled to the processor can send the indication (e.g., an instruction, a signal, a request, a command, etc.), thereby causing the processor to enter the low-power mode. After all the modified sectors are saved to memory, some embodiments enter the low-power mode, during which voltage to circuits in the processor is reduced.

By performing rinsing operations at sector-level granularity, i.e., by saving only modified sectors to memory, embodiments of the present invention enable quicker entry into a low-power mode, e.g., when compared to designs that save all of the architectural state to memory prior to entering the low-power mode. In addition, some embodiments perform the rinsing operations using background bus cycles, e.g., while utilization of a processor bus is low, thereby minimizing interference of saving the architectural state with active processor workloads.

Computing Device

Figure 1:
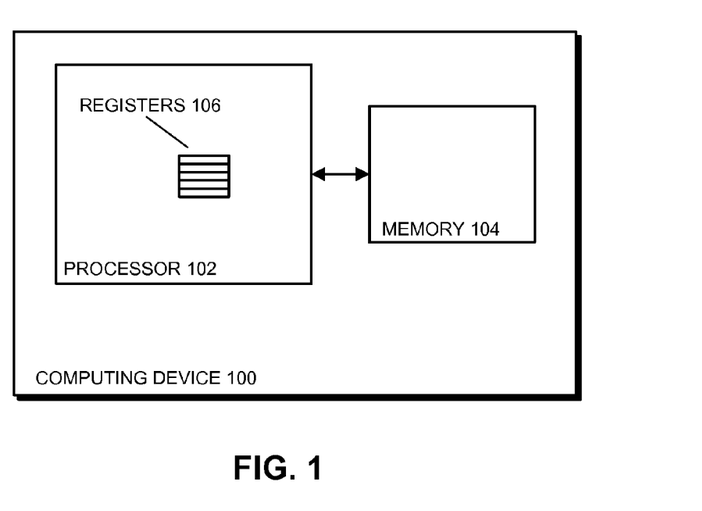
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes processor 102 and memory 104 coupled to processor 102.

Processor 102 is a functional block that performs computational operations in computing device 100. Processor 102 includes one or more central processing units (CPUs), graphics processing units (GPUs), embedded processors, application specific integrated circuits (ASICs), and/or other computational mechanisms.

Memory 104, which in some embodiments is the "main memory" of computing device 100, comprises memory circuits such as one or more of DRAM, DDR SDRAM, and/or other types of memory circuits, as well as control circuits for handling accesses of the instructions and data that are stored in the memory circuits. In some embodiments, a communication path (that includes one or more busses, wires, and/or connections) is coupled between processor 102 and memory 104, as shown in FIG. 1 by arrow-headed lines between the elements. This communication path is used to transmit commands, data, and/or other information between processor 102 and memory 104.

Processor 102 includes a set of registers 106, which store the architectural state of processor 102, e.g., execution results, configuration data, and/or status information that must be saved before processor 102 enters a power-gated mode so that an architectural state of processor 102 can subsequently be restored when transitioning from the power-gated mode to a full-power mode. Registers 106 include registers that can be modified by software executing in processor 102, and/or read-only registers than are modified by hardware but can only be read by software.

Although computing device 100 is described with a particular arrangement of elements/functional blocks, some embodiments include a different number and/or arrangement of elements/functional blocks. For example, some embodiments have multiple processors. As another example, in some embodiments, computing device 100 includes a number of cache memories. As yet another example, in some embodiments, registers 106 are located elsewhere in computing device 100, but usable as described herein. Generally, the described embodiments can use any number or arrangement of functional blocks/elements that can perform the operations herein described.

In addition, although computing device 100 is simplified for illustrative purposes, in some embodiments, computing device 100 includes additional functional blocks/elements for performing the operations herein described and/or other operations. For example, computing device 100 may include memory controllers, input/output (I/O) controllers, power controllers, batteries, media processors, communication mechanisms, networking mechanisms, display mechanisms, etc.

Computing device 100 can be, or can be included in, any electronic device that performs computational operations. For example, computing device 100 can be, or can be included in, electronic devices such as desktop computers, laptop computers, wearable computing devices, tablet computers, smart phones, servers, network appliances, toys, audio-visual equipment, home appliances, controllers, etc., and/or combinations thereof.

Register Sectors and Needs-Rinsing Flags

Figure 2:
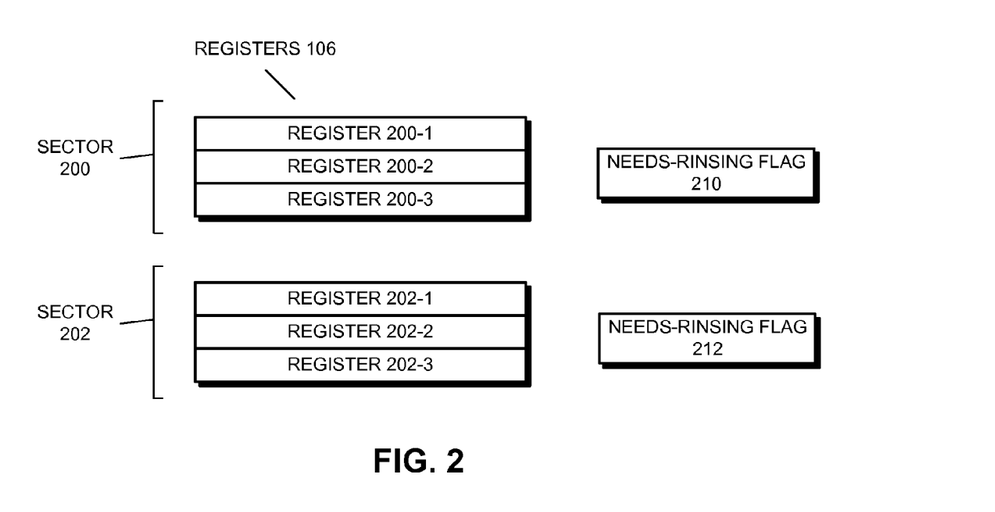
FIG. 2 presents a block diagram illustrating a set of processor registers and flags in accordance with some embodiments.

FIG. 2 presents a block diagram illustrating a set of processor registers and flags in accordance with some embodiments. More specifically, FIG. 2 shows details of registers 106 of processor 102 (see FIG. 1) in accordance with some embodiments.

As can be seen in FIG. 2, registers 106 are divided into sectors 200-202, each of the sectors including a subset of registers 106. More specifically, sector 200 includes registers 200-1 through 200-3, and sector 202 includes registers 202-1 through 202-3. In some embodiments, the division of registers 106 into sectors 200-202 is logical, i.e., there are no physical boundaries denoting the different sectors in processor 102. For example, registers 106 may be a bank of register circuits within processor 102 that is logically divided into sectors.

Processor 102 includes a "needs-rinsing" flag for each register sector. More specifically, processor 102 includes needs-rinsing flag 210 for sector 200, and needs-rinsing flag 212 for sector 202. Processor 102 sets the needs-rinsing flag for a sector whenever a write to one of the registers in that sector occurs. For example, processor 102 sets needs-rinsing flag 210 whenever writing to (or otherwise modifying, updating, changing, etc. the value in) any of registers 200-1 through 200-3, and sets needs-rinsing flag 212 whenever writing to (or otherwise modifying, updating, changing, etc. the value in) any of registers 202-1 through 202-3. Processor 102 resets the needs-rinsing flag for a sector upon rinsing that sector, i.e., upon performing a rinsing operation for the sector as described later with reference to FIG. 3. In some embodiments, processor 102 resets the needs-rinsing flag for each sector when computing device 100 and/or processor 102 boot, are reset, and/or are initialized.

Although registers 106 are shown as including two sectors with three registers each, in other embodiments registers 106 comprise a different number of registers and/or a different number of sectors. In some embodiments, registers 106 are divided into sectors on a per-register basis, so that each sector includes only one register (in some of these embodiments, processor 102 includes a needs-rinsing flag for each register in registers 106). Also, note that each sector need not contain the same number of registers.

Note that needs-rinsing flags 210-212 can reside anywhere on processor 102. In some embodiments, registers 106, sectors 200-202, and/or needs-rinsing flags 210-212 are located in processor 102 with respect to one another in such a way to enable the operations herein described.

Rinsing Operation

Figure 3:
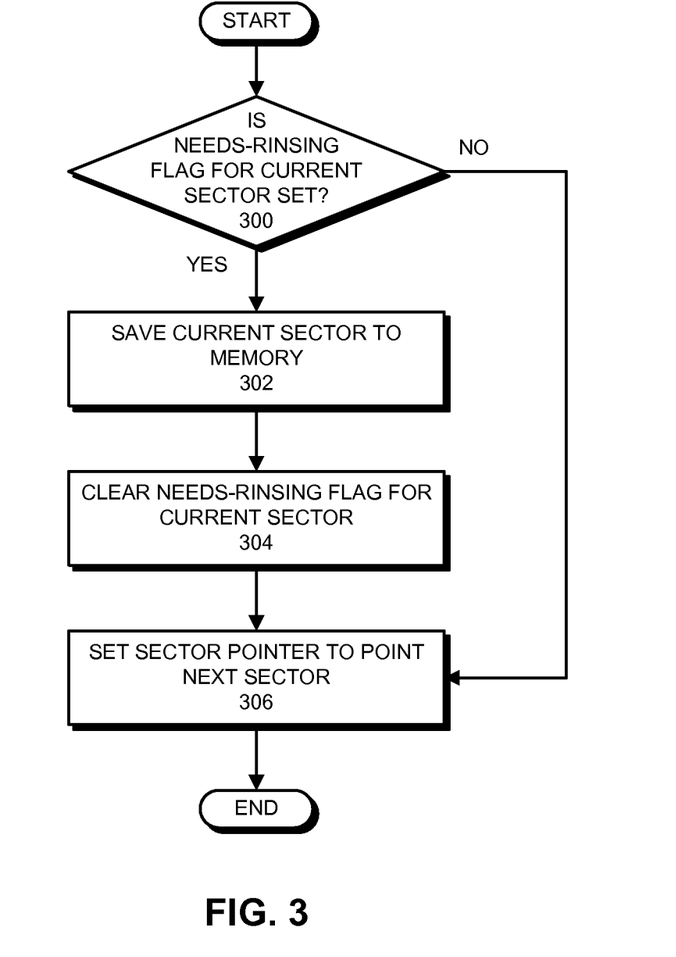
FIG. 3 presents a flowchart illustrating a process for performing a rinsing operation in accordance with some embodiments.

FIG. 3 presents a flowchart illustrating a process for performing a rinsing operation in accordance with some embodiments. In some embodiments, the process shown in FIG. 3 is performed periodically, e.g., every N instruction cycles/executed instructions, or every t seconds (where N and/or t can be a fixed value or can be programmable by software executing on processor 102). In some embodiments, the rinsing operation is performed upon determining that processor 102 is idle, e.g., when the load for processor 102 is below or will be/is predicted to be below a threshold (this threshold can be a fixed value, or can be programmable by software executing on processor 102). In some embodiments, processor 102 includes a hardware state machine (not shown) for performing the rinsing operation. In other embodiments, processor 102 performs the rinsing operation using microcode and/or other program code. Note that the operations shown in FIG. 3 are presented as a general example of operations performed by some embodiments. The operations performed by other embodiments include different operations and/or operations that are performed in a different order. Additionally, although certain functional blocks are used in describing the operations (e.g., processor 102, etc.), in some embodiments, other functional blocks perform the operations.

In some embodiments, processor 102 performs the rinsing operation for each sector in registers 106 in a sequence, e.g., in a round-robin fashion. For example, processor 102 can perform the rinsing operation for each sector periodically, looping around to the first sector after performing the rinsing operation for the last sector. The order of sectors in which processor 102 performs the rinsing operation can be simple (e.g., linear or sequential), complex (e.g., computed using a function based on input parameters), or random. Embodiments of the present invention are not limited to a particular sector ordering, as long as processor 102 can determine a next sector from a current sector.

The process for performing a rinsing operation begins with processor 102 determining whether the needs-rinsing flag for a given sector (i.e., a "current sector") is set (step 300). Processor 102 determines which sector is the current sector by using a sector pointer (or other identifier) that points to (identifies) a sector in registers 106. Note that the sector pointer is generally initialized (e.g., when processor 102 is reset) to point to a first sector in registers 106, and processor 102 then increments the sector pointer to iterate through other sectors in registers 106, e.g., in a round-robin fashion.

If the needs-rinsing flag for the current sector is not set (step 300, No), processor 102 sets the sector pointer to point to the next sector (step 306). For example, and with reference to FIG. 2, if the current sector is sector 200, at step 306 processor 102 sets the sector pointer to point to sector 202, and if the current sector is sector 202, processor 102 sets the sector pointer to point to sector 200. Recall that the needs-rinsing flag for a sector is not set when no writes have been performed on registers in the sector since the last rinsing operation or since the needs-rinsing flag was otherwise reset/cleared (e.g., at startup, etc.), as described above.

If the needs-rinsing flag for the current sector is set (step 300, Yes), processor 102 saves the current sector to memory 104, i.e., saves the contents of all registers in the current sector to memory 104 (step 302). Memory 104 is a storage location whose contents are preserved while the processor is in a power-gated/low-power mode. In some embodiments, memory 104 is volatile memory whose contents are retained during the power-gated mode, e.g., a DRAM external to the processor that is powered separately from the processor, such as with a separate supply voltage, a battery, a charge storage device, etc. In some embodiments, memory 104 is non-volatile storage, such a hard disk or flash memory.

In some embodiments, while saving the current sector to memory, processor 102 is configured to write the contents of the registers in the current sector to memory 104 using background and/or opportunistic memory cycles, i.e., when there is little utilization of memory 104 and/or a bus coupling processor 102 and memory 104. In these embodiments contention for memory cycles with actively running workloads is reduced during the rinsing operation, thereby improving performance for the actively running workloads (in contrast to an embodiment where processor 102 uses memory cycles that would otherwise be used by actively running workloads).

Next, processor 102 clears/resets the needs-rinsing flag for the current sector (step 304). Then, processor 102 sets the sector pointer to point to the next sector in registers 106 (step 306). For example, as described earlier, if the current sector is not the last sector in the sequence of sectors, processor 102 can increment the sector pointer to point to the next sector in the sequence. Otherwise, if the current sector is the last sector in the sequence of sectors, processor 102 sets the sector counter to point to the first sector for registers 106.

Save State Operation

Figure 4:
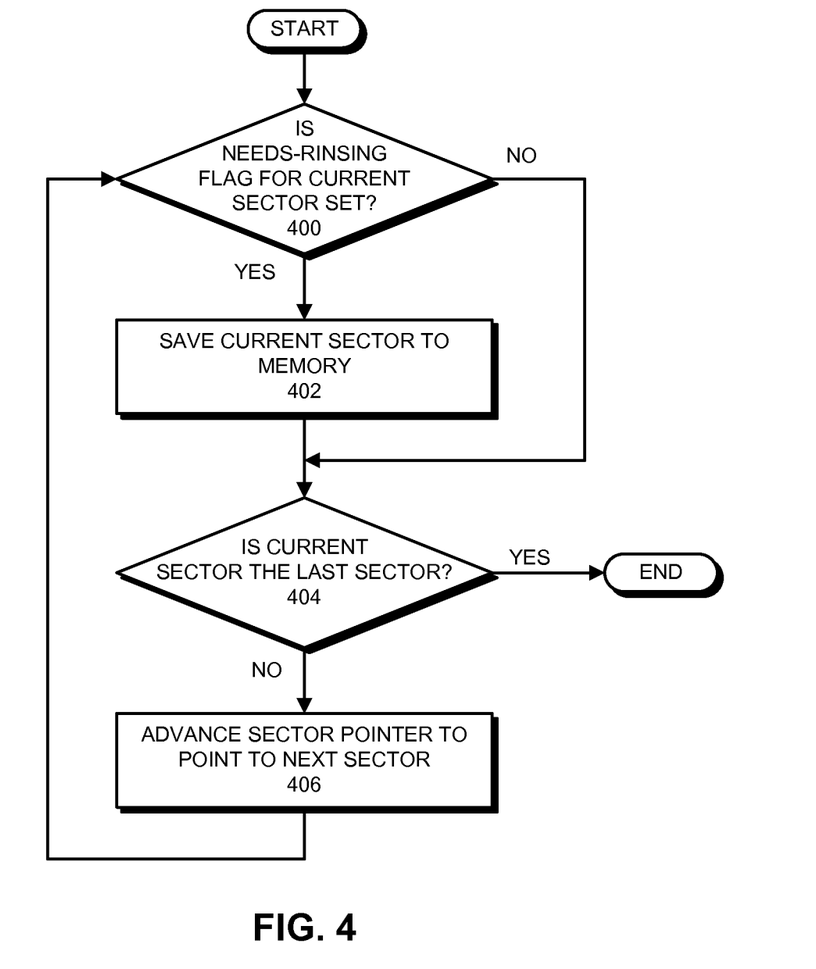
FIG. 4 presents a flowchart illustrating a process for saving processor state in accordance with some embodiments.

FIG. 4 presents a flowchart illustrating a process for saving processor state (i.e., performing a save state operation) in accordance with some embodiments. In some embodiments, the process shown in FIG. 4 is performed upon processor 102 receiving an indication (e.g., instruction, command, and/or signal) that processor 102 and/or computing device 100 are to enter a low-power mode. For example, in some embodiments, software such as an operating system or an application that is executed by processor 102 (or another processor), and/or a hardware functional block coupled to processor 102 can send the indication, thereby causing processor 102 and/or computing device 100 to enter the low-power mode. In some embodiments, the process shown in FIG. 4 is performed periodically. Note that the operations shown in FIG. 4 are presented as a general example of operations performed by some embodiments. The operations performed by other embodiments include different operations and/or operations that are performed in a different order. Additionally, although certain functional blocks are used in describing the operations (e.g., processor 102, etc.), in some embodiments, other functional blocks perform the operations.

The process begins with processor 102 determining whether the needs-rinsing flag for the current sector is set (step 400). In some embodiments, processor 102 uses the sector pointer described above with reference to FIG. 3 to determine the current sector. In some of these embodiments, processor 102 resets the sector pointer prior to starting the save state operation so that the sector pointer points to the first sector for registers 106 at the start of the save state operation. In other embodiments, processor 102 maintains a separate sector pointer for performing the save state operation from the sector pointer that processor 102 uses for the rinsing operation.

If the needs-rinsing flag for the current sector is set (step 400, Yes), processor 102 saves the current sector to memory (step 402). Generally, when performing operations for step 402, processor 102 performs some or all of the same operations that processor 102 performs to save a sector to memory during a rinsing operation (see FIG. 3, step 302). Hence, at step 402, processor 102 can save to memory any register data that has been modified since the last time the sector was rinsed.

Next, or if the needs-rinsing flag for the current sector is not set (step 400, No), processor 102 determines whether the current sector is the last sector (step 404). For example, at step 404 processor 102 can determine whether the sector pointer points to the last sector in the sequence of sectors.

If the current sector is the last sector (step 404, Yes), the process ends. In some embodiments, when the process ends, processor 102 resets the needs-rinsing flags for sectors 200-202. In some embodiments, when the process ends, processor 102 also resets dirty flags for registers 106 (dirty flags are described in more detail later with reference to FIGS. 5-6).

Otherwise, if the current sector is not the last sector (step 404, No), processor 102 advances the sector pointer to point to the next sector (step 406). Hence, in some embodiments, processor 102 iteratively performs operations 400-404 for each sector of registers 106.

Register Sectors with Register Dirty Flags

Figure 5:
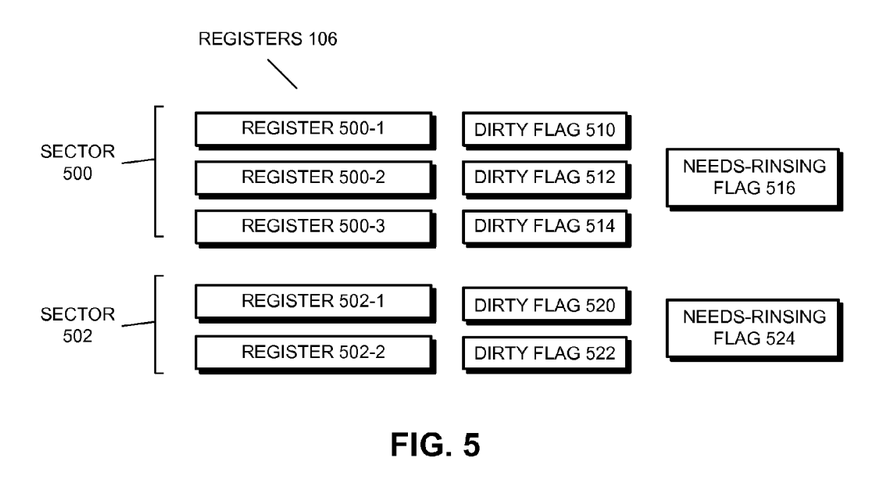
FIG. 5 presents a block diagram illustrating a set of processor registers and register dirty flags in accordance with some embodiments.

FIG. 5 presents a block diagram illustrating a set of processor registers and register dirty flags in accordance with some embodiments. More specifically, FIG. 5 shows details of register 106 of processor 102 (see FIG. 1). Note that the operations shown in FIG. 5 are presented as a general example of operations performed by some embodiments. The operations performed by other embodiments include different operations and/or operations that are performed in a different order. Additionally, although certain functional blocks are used in describing the operations (e.g., processor 102, etc.), in some embodiments, other functional blocks perform the operations.

In the embodiments shown in FIG. 5, registers 106 are divided into sectors 500-502. In the illustrated embodiments, sector 500 includes three registers (register 500-1 through 500-3), whereas sector 502 includes two registers (registers 502-1 and 502-2). As described earlier with reference to FIG. 2, in some embodiments the division of registers 106 into sectors 500-502 is logical, i.e., there are no physical boundaries denoting the different sectors.

Similar to embodiments shown in FIG. 2, the embodiments shown in FIG. 5 include a needs-rinsing flag for each sector, i.e., needs-rinsing flag 516 for sector 500 and needs-rinsing flag 524 for sector 502. As described earlier with reference to FIG. 2, processor 102 sets the needs-rinsing flag for a sector whenever a write to one of the registers in that sector occurs. In some embodiments, processor 102 resets needs-rinsing flags 516 and 524 when processor 102 boots, resets, and/or is initialized.

The embodiments shown in FIG. 5 include a dirty flag for each register in registers 106. Processor 102 sets the dirty flag for a register when a write occurs to that register. For example, when writing data to register 500-2, processor 102 sets dirty flag 512. In some embodiments, processor 102 resets all register dirty flags for registers 106, i.e., dirty flags 510-514 and 520-522, when computer system 100 and/or processor 102 boots, resets, and/or is initialized.

As described below with reference to FIG. 6, some embodiments use register dirty flags, e.g., dirty flags 510-514 and 520-522, to save a subset of registers in a sector during the rinsing loop, instead of saving all registers in the sector, including those registers that have not been modified since the last rinsing loop for that sector. Hence, embodiments that use register dirty flags achieve greater granularity for rinsing operations, which can translate to quicker, more efficient, and less power-consuming rinsing operations.

Rinsing Operation Using Register Dirty Flags

Figure 6:
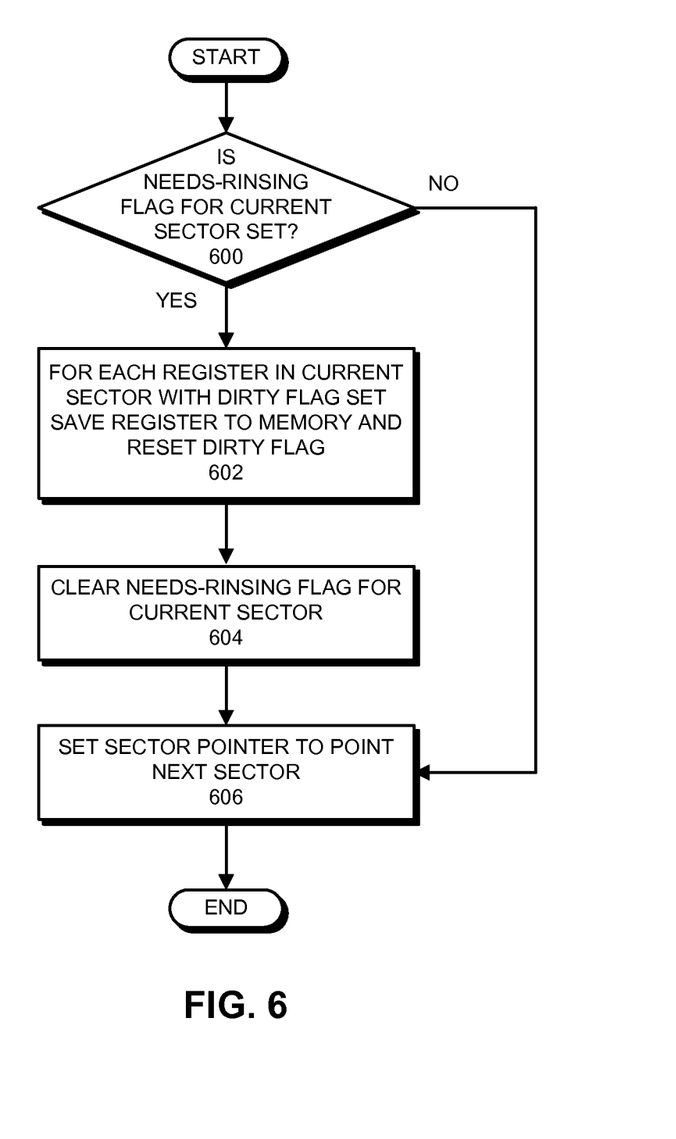
FIG. 6 presents a flowchart illustrating a process for performing a rinsing operation using register dirty flags in accordance with some embodiments.

FIG. 6 presents a flowchart illustrating a process for performing a rinsing operation using register dirty flags in accordance with some embodiments. As discussed earlier with reference to FIG. 3, the rinsing operation can be performed periodically, or upon determining that the processor is idle. Note that the operations shown in FIG. 6 are presented as a general example of operations performed by some embodiments. The operations performed by other embodiments include different operations and/or operations that are performed in a different order. Additionally, although certain functional blocks are used in describing the operations (e.g., processor 102, etc.), in some embodiments, other functional blocks perform the operations.

When performing operations for steps 600 and 604-606, processor 102 performs operations that are similar to those for steps 300 and 304-306 of the process shown in FIG. 3. Therefore, steps 600 and 604-606 are not described in more detail here.

When the needs-rinsing flag for the current sector is set (step 600, Yes), thereby indicating that at least one register for the current sector has been modified since the last rinsing operation/loop for the sector, for each register in the current sector for which the dirty flag is set, processor 102 saves the register to memory and resets the dirty flag for the register (step 602).

For example, with reference to FIG. 5, processor 102 sets dirty flag 512 upon writing to register 500-2. In this example, when performing the rinsing loop for sector 500, processor 102 saves the contents of register 500-2 to memory 104, resets dirty flag 512, and resets needs-rinsing flag 516 (this example assumes that dirty flags for other registers in sector 500 were not set since the last rinsing operation, i.e., other registers in sector 500 had not been modified since the last rinsing operation). Savings the contents of only a subset of registers in a sector, i.e., only the registers in the sector that were modified since the last rinsing loop for that sector, provides more efficient rinsing operations that use fewer memory bus cycles.

Save State Operation Using Register Dirty Flags

In some embodiments that use register dirty flags, such as embodiments shown in FIG. 5, the process for performing a save state operation is the same as that shown in FIG. 4 (i.e., element 402 in FIG. 4 is adjusted to incorporate the dirty flags as shown in element 602 in FIG. 6). Hence, the process for performing a save state operation in embodiments that use register dirty flags is not described in more detail here.

In some embodiments that use register dirty flags, when the process for performing a save state operation ends, processor 102 resets dirty flags for registers 106 as well as needs-rinsing flags for register sectors. For example, with reference to FIG. 5, at the end of the save state operation processor 102 can reset dirty flags 510-514 and 520-522, and needs-rinsing flags 516 and 524.

Entering a Power-Gated Mode

Figure 7:
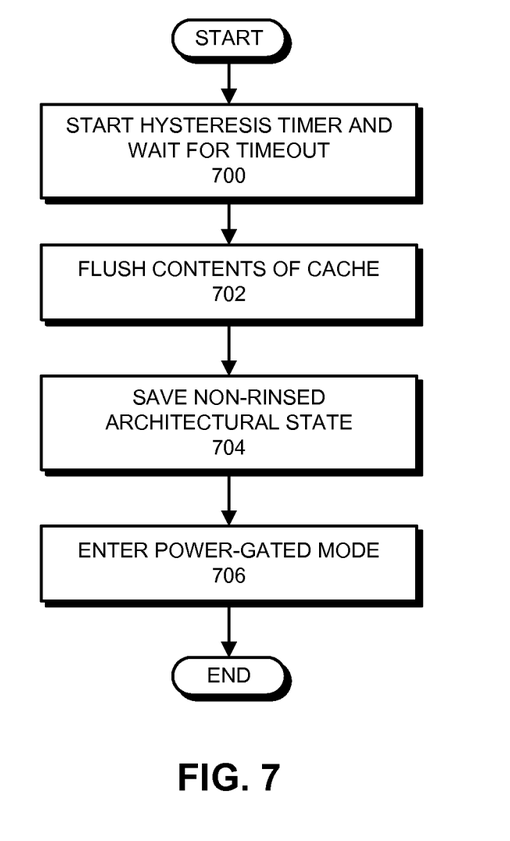
FIG. 7 presents a flowchart illustrating a process for entering a power-gated mode in accordance with some embodiments.

FIG. 7 presents a flowchart illustrating a process for entering a power-gated mode in accordance with some embodiments. In some embodiments, processor 102 performs operations for the process shown in FIG. 7 upon determining or receiving an indication that processor 102 has become idle. In some embodiments, processor 102 performs operations for the process shown in FIG. 7 upon receiving an instruction to enter the power-gated mode. Note that the operations shown in FIG. 7 are presented as a general example of operations performed by some embodiments. The operations performed by other embodiments include different operations and/or operations that are performed in a different order. Additionally, although certain functional blocks are used in describing the operations (e.g., processor 102, etc.), in some embodiments, other functional blocks perform the operations.

The process for entering the power-gated mode begins with processor 102 starting a hysteresis countdown timer and waiting for the timer to timeout, i.e., expire (step 700). In some embodiments, waiting for the hysteresis timer to expire prevents performance loss due to premature entry into the power-gated mode when there is a high frequency of interrupts for processor 102.

Next, processor 102 flushes the contents of a cache (step 702). In some embodiments, when flushing the contents of the cache, processor 102 sends all modified contents of the last-level cache for processor 102 to the next level in the cache hierarchy (which can be another cache level, or a DRAM, e.g., memory 104).

Then, processor 102 saves any non-rinsed architectural state to a storage location that is powered-on even when processor 102 is in the power-gated mode (step 704). In some embodiments, at step 704, processor 102 performs operations to save state as described earlier with reference to FIG. 4.

Next, processor 102 enters the power-gated mode (step 706), which can involve reducing the operating voltage to some or all of processor 102 to a level that causes the architectural state of processor 102, e.g., contents of registers 106, to be lost. The process then ends.

Note that, although certain operations are described with respect to entering a power-gated mode in FIG. 7, in some embodiments, the operations are different. For example, in some embodiments, the decision to enter the power-gated mode is made without the hysteresis timer and/or in accordance with one or more factors in combination with a timer. As another example, some embodiments perform operations for saving the non-rinsed architectural state for reasons other than power-gating, e.g., as part of a periodic write back operation, etc.

Embodiments of the present invention achieve faster entry into power-gated mode than computer systems that save all of the architectural state when entry into power-gated mode is desired. In some embodiments, race conditions could arise when a register write to a given sector occurs after processor 102 just performed a rinsing operation for that sector. In these embodiments, the race conditions can be avoided by enforcing atomic reads and/or writes to dirty and/or needs-rinsing bits.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method, comprising:
    performing a save state operation for each sector in a set of sectors of an architectural state of a processor, where each sector in the set of sectors comprises a different and separate portion of the architectural state of the processor, and wherein each sector in the set of sectors includes processor circuit elements that are used for storing a corresponding portion of the architectural state of the processor, by:

determining whether the architectural state for the sector has already been saved to a memory; and when the architectural state for the sector has not already been saved to the memory, saving the architectural state for the sector to the memory.

2. The method of claim 1, further comprising:

upon modifying a given sector in the set of sectors, causing a needs-rinsing flag for the given sector to be asserted, wherein determining whether the architectural state for the given sector has already been saved to the memory comprises checking the needs-rinsing flag for the given sector.

3. The method of claim 2, further comprising:

performing a rinsing operation for the given sector, wherein performing the rinsing operation comprises:

determining whether the needs-rinsing flag for the given sector is set; and when the needs-rinsing flag for the given sector is set, saving the architectural state for the given sector to the memory.

4. The method of claim 3, further comprising:

resetting the needs-rinsing flag for the given sector after saving the architectural state for the given sector to the memory.

5. The method of claim 3, further comprising:

determining that the rinsing operation is to be performed based on at least one of:

a number of instructions executed by the processor since a previous rinsing operation;

a time elapsed since the previous rinsing operation; and a load of the processor.

6. The method of claim 1, wherein the save state operation is performed upon receiving an indication that the processor is to enter a low-power mode.

7. The method of claim 1, wherein saving the architectural state for the sector to the memory comprises using background bus cycles to perform the saving.

8. The method of claim 1, wherein at least one of the sectors comprises two or more processor registers.

9. The method of claim 1, wherein each of the sectors comprises only one processor register.

10. The method of claim 1, further comprising entering a low-power mode for the processor after the architectural state for every sector in the set of sectors has been saved to the memory, wherein entering the low-power mode comprises reducing a voltage for the set of sectors, thereby rendering the set of sectors unable to maintain the architectural state.

11. A non-transitory computer-readable storage medium comprising instructions that, when executed by a processor, cause the processor to perform a method comprising:

performing a save state operation for each sector in a set of sectors of an architectural state of a processor, where each sector in the set of sectors comprises a different and separate portion of the architectural state of the processor, and wherein each sector in the set of sectors includes processor circuit elements that are used for storing the corresponding portion of the architectural state of the processor, by:

determining whether the architectural state for the sector has already been saved to a memory; and when the architectural state for the sector has not already been saved to the memory, saving the architectural state for the sector to the memory.

12. The non-transitory computer-readable storage medium of claim 11, wherein the method further comprises:

upon modifying a given sector in the set of sectors, causing a needs-rinsing flag for the given sector to be asserted, wherein determining whether the architectural state for the given sector has already been saved to the memory comprises checking the needs-rinsing flag for the given sector.

13. The non-transitory computer-readable storage medium of claim 12, wherein the method further comprises:

performing a rinsing operation for the given sector, wherein performing the rinsing operation comprises:

determining whether the needs-rinsing flag for the given sector is set; and when the needs-rinsing flag for the given sector is set, saving the architectural state for the given sector to the memory.

14. The non-transitory computer-readable storage medium of claim 13, wherein the method further comprises:

resetting the needs-rinsing flag for the given sector after saving the architectural state for the given sector to the memory.

15. The non-transitory computer-readable storage medium of claim 13, wherein the method further comprises:

determining that the rinsing operation is to be performed based on at least one of:

a number of instructions executed by the processor since a previous rinsing operation;

a time elapsed since the previous rinsing operation; and a load of the processor.

16. The non-transitory computer-readable storage medium of claim 11, wherein the save state operation is performed upon receiving an indication that the processor is to enter a low-power mode.

17. The non-transitory computer-readable storage medium of claim 11, wherein saving the architectural state for the sector to the memory comprises using background bus cycles to perform the saving.

18. The non-transitory computer-readable storage medium of claim 11, wherein at least one of the sectors comprises two or more processor registers.

19. The non-transitory computer-readable storage medium of claim 11, wherein the method further comprises entering a low-power mode for the processor after the architectural state for every sector in the set of sectors has been saved to the memory, wherein entering the low-power mode comprises reducing a voltage for the set of sectors, thereby rendering the set of sectors unable to maintain the architectural state.

20. An apparatus, comprising:

a processor;

wherein the processor performs a save state operation for each sector in a set of sectors of an architectural state of the processor, where each sector in the set of sectors comprises a different and separate portion of the architectural state of the processor, and wherein each sector in the set of sectors includes processor circuit elements that are used for storing the corresponding portion of the architectural state of the processor, by:

determining whether the architectural state for the sector has already been saved to a memory; and when the architectural state for the sector has not already been saved to the memory, saving the architectural state for the sector to the memory.

21. A system, comprising:
a processor; and
a memory coupled to the processor;
wherein the processor receives an indication that the processor is to enter a low-power mode; and
wherein the processor, based on receiving the indication, performs a save state operation for each sector in a set of sectors of an architectural state of the processor, where each sector in the set of sectors comprises a different and separate portion of the architectural state of the processor, and wherein each sector in the set of sectors includes processor circuit elements that are used for storing the corresponding portion of the architectural state of the processor, by:
 determining whether the architectural state for the sector has already been saved to the memory; and
 when the architectural state for the sector has not already been saved to the memory, saving the architectural state for the sector to the memory.

22. The system of claim 21, further comprising:
an operating system;
wherein receiving the indication comprises:
 receiving an instruction from the operating system, the instruction causing the processor to enter the low-power mode.

23. The system of claim 21, wherein at least one of the sectors comprises two or more processor registers.

24. The system of claim 21, further comprising entering the low-power mode for the processor after the architectural state for every sector in the set of sectors has been saved to the memory, wherein entering the low-power mode comprises reducing a voltage for the set of sectors, thereby rendering the set of sectors unable to maintain the architectural state.

* * * * *